United States Patent Office 2,989,482
Patented June 20, 1961

2,989,482
CERAMIC TITANATE PIEZOELECTRIC COMPOSITION AND METHOD FOR PREPARING SAME
Walter S. Miller, Elmont, N.Y., assignor to American Bosch Arma Corporation, a corporation of New York
No Drawing. Filed Nov. 4, 1958, Ser. No. 771,734
16 Claims. (Cl. 252—62.9)

The invention relates to an improved method of making polycrystalline ceramic titanates which exhibit useful piezoelectric and other electrical properties.

In recent years, considerable effort has been expended in developing certain polycrystalline ceramics of the perovskite type structure for useful piezoelectric, ferroelectric, and dielectric usage. Many of these ceramics of the type here under consideration have been tested with various addition agents designed to improve the operating characteristics of the polycrystalline material. But in every instance it has been found necessary to permanently polarize the ceramics by the application thereto of a rather high unidirectional D.C. voltage during the manufacturing process. It has also been determined that the piezoelectric properties of the ceramics are maintained only as long as the crystal is of the tetragonal symmetry. If the temperature of the crystal is raised above the Curie point or transformation point of the crystal, the remnant piezoelectric and ferroelectric properties are destroyed and the material must be reactivated by the reapplication of a similarly strong polarizing electric field. The Curie points of these ceramics are also generally low, in the neighborhood of 120° C., thus considerably limiting their application. Finally, it has been recognized that the ceramic titanates suffer the disadvantage of losing a relatively substantial degree of their sensitivity over a period of time. For instance, barium titanate ceramic bodies may lose as much as 30% of their sensitivity over a period of approximately five to six months.

In applicant's co-pending application, entitled "Plastic Titanate Piezoelectric Compositions," Serial No. 771,722, filed of even date, there is disclosed a method for chemically growing a polycrystalline titanate to form a plastic mass having piezoelectric properties without recourse to the required polarization step, and which overcomes many of the above-mentioned disadvantages of the ceramics. In that application, it was disclosed that the addition of lithium salts and other additives to a titanate-polyethylene glycol slurry partially reduced the titanate in an exothermic reaction to a complex titanate crystal. The heat of reaction aided by the presence of the lithium ion yielded a complex plastic crystal having a peculiar dipole alignment and a resultant inherent polarization. Other additives, such as selenous acid, were also utilized to provide negative or positive ions for an ionic imbalance in the final crystal. It is believed that the final titanate-titanite crystal held the various additive ions physically and chemically within the crystal structure, and that various properties were obtained depending on the proportions of additives used. However, the crystalline masses described in the co-pending application are plastic in nature making them unsuitable for many applications requiring a ceramic body and additionally the chemical reduction as to the present compounds has been found to be insufficient standing alone to promote polarity.

It is thus a primary object of the invention to provide a new method of making a polycrystalline polarized ceramic body exhibiting useful piezoelectric properties, without recourse to the step of placing the material in a strong electric field to polarize it. It is also an object of the invention to provide a method of making a polycrystalline polarized ceramic body wherein the component mix is chemically processed so as to give a polarized ceramic on firing the mix to its ceramic state. It is also an object to provide a method of producing a ceramic piezoelectric body having an unusually high Curie or transformation point. Other objects of the present invention will become apparent from consideration of the present specification and claims.

In accordance with the above mentioned objects, applicant has developed a method of producing a piezoelectric ceramic body of the perovskite type structure from a titanate-polyethylene glycol slurry, said body having an inherent dipole alignment, and thus positive or negative polarity, induced both by certain chemical reducing components controlling crystal growth and the subsequent firing step. The reducing components preferably compounds containing the lithium ion yield a peculiar crystal structure, which though not polarized in the plastic state, is polarized on being fired in a reducing or oxidizing atmosphere. The reduction with the lithium ions below the Curie point at 140°–230° F. partially grows a complex titanate crystal throughout the plastic mass, the growth of which is completed by firing the plastic mass in a reducing or oxidizing atmosphere resulting in the said polarized crystal. Whether a reducing or oxidizing atmosphere is used depends on the nature of and amount of additives used in the prior chemical reducing step. The resultant polycrystalline ceramic polarized mass is believed to be a complex titanate-titanite crystal, the amounts of reducing components added and reducing or oxidizing atmosphere being sufficient to generally only partially reduce the titanate crystal. The said crystal incorporates physically and chemically the growth controlling reducing components and other additives and perhaps components of the long chain polyethylene glycol forming the above mentioned slurry. Each reducing component, additive or agent along with the particular firing schedule utilized is influential in effecting a radical crystal structure exhibiting specific electrical properties. The transformation point or Curie point of these crystals is believed to be in the neighborhood of about 500° F. Also, since the polarization of the crystal is induced both chemically and by being fired in a reducing or oxidizing atmosphere the piezoelectric or other electrical properties specific to the crystals are not adversely affected by the application of heat or the passage of time.

Generally, barium titanate comprises a major proportion of the starting material ranging from about 30 to 90% and preferably from about 60 to 90%. Additional amount of other well-known isomorphic titanates of the perovskite crystal structure may be admixed with the barium titanate as additives influencing the Curie point. These titanates include calcium, strontium titanates, and active zirconium and lead titanates. Amounts of these additives range from 0–60% and preferably are in the range of 2–15%. Such isomorphic mixtures of barium titanates with other metallic titanates may be grouped and termed "piezoelectric metallic titanates" following the terminology of the Howatt Patent 2,507,253.

From a practical standpoint, crystals having a predominant portion of barium titanate exhibit the most useful electrical properties, and thus most of the examples of the present invention disclose a predominant percentage of barium titanate in the starting mixture.

As a preferred conveyor and plasticizing agent for the titanate starting mix forming the starting slurry, applicant utilizes a liquid polyalkylene glycol such as polyethylene glycol, Nos. 100–200–300–400 (Union Carbide Corporation), in adequate amounts to form said plastic slurry. Slurry as used here is preferably a stiff viscous mass, elastic in structure, of the consistency of SAE–150 grease. However, thinner or thicker mixtures may be used if it appears advisable for various reasons in the final product. Operable, but not preferred, slurry producers include water and certain acids such as HCl, and $H_2SO_4$, but it is believed that the polyethylene glycol or decomposition products thereof enter into chemical or physical combination in the final crystal and thus actively contribute to the physical and electrical properties obtained.

The reducing component for activating the above noted piezoelectric titanates is preferably selected from a compound providing lithium ions, such as the lithium halides (LiCl, LiBr), $Li_2S$, and LiOH, in the amount of from 1 to 40%, and preferably from about 5 to 15%, of the final dry mixture, and provides the desired heat of reaction for chemically growing the titania crystal to its polarized state. In some cases, the lithium ion may be provided by lithium titanate which provides a dual function as an isomorphic titanate modifier for barium titanate, as well as an active reducing agent. Applicant has found that among the group 1A elements, the lithium ion and particularly the lithium salts give the preferred reduction and heat of reaction necessary to yield the plastic mass which becomes polarized on firing. Secondary operable reducing agents also include zinc chloride, specifically desirable for yielding an ionic interchange type crystal useful for an alkaline battery. It should be noted that LiF and other lithium salts have been proposed before as fluxes in the crystallization of $BaTiO_3$. In the present invention, the lithium ion actively enters the polycrystalline titania structure, chemically and physically reacting with the titanate, and is not a mere flux. In preparing the plastic compositions of the present invention the lithium compound or reducing agent is added last to the mixture to provide a heat of reduction which can be utilized by the entire mixture.

The exothermic heat of reduction or heat of reaction produced by the addition of the reducing component is generally in the range of 140°–230° F. and is a function of the amount of reducing component utilized. The heat of reduction is generally well below the transformation point of the reduced titanite and/or titanate.

In certain of the compositions, to achieve specific properties, other additive such as CuCl, CuO, ZnO, and selenous acid are utilized to provide a surplus of predominantly positive or negative crystalline structures. For instance, selenous acid provides negative ions for an imbalance in the total crystal to provide rectifier action and/or photo-sensitivity.

It will be noted in the following examples that if the compositions are totaled with respect to the number of electrons in the outer rings of each component that there will be a surplus or a deficit in the total. For instance, a predominance of positive or negative ions in the crystal structure will influence the dipole alignment achieved in the partially reduced titanate crystal, and thus alter the various work functions of the final polycrystalline mass.

The specific percentages of reducing components and additives in particular used in the examples of the invention are critical, both with respect to the method utilized to yield a polarized crystal and the particular properties obtained. It is believed that in some instances, the percentages may be varied as much as one-fifth, but generally, the percentages recited are critical. The end products obtained when the percentages are varied more than one-fifth are very unstable and tend to degrade quickly.

For instance, in the aforementioned co-pending application Serial No. 771,722 entitled, "Plastic Titanate Piezoelectric Compositions," Example 2 recites adding 5% LiCl to a slurry comprising 90% $BaTiO_3$ and 5% LiOH, giving a heat of reduction of about 165° F. and yielding a polarized plastic mass. In the present application, Example 2 recites adding 6% LiCl to a slurry comprising 86% $BaTiO_3$, 3% $PbTiO_3$, and 5% LiOH, giving a heat of reduction of 180° F., and yielding a non-polarized plastic mass which becomes activated on being fired. The properties displayed by the two crystals are also different.

Following the chemical reduction of the titanate slurry, the mixture is subjected to a firing schedule in an oxidizing or reducing atmosphere to produce the final ceramic product. The temperature range during firing is from 2500° to 3000° F. Whether an oxidizing or reducing atmosphere is used depends on the particular nature of and amounts of reducing components, and additives used during the chemical reduction process, and the properties desired. It is the combination of a particular and critical chemically influenced reduction plus continued reduction or oxidation during firing which produces specific and particular properties.

In accordance with the patent to Roup 2,520,376, a layerized $BaTiO_3$ ceramic body was produced by alternate firing in an oxidizing and reducing atmosphere, with a rare earth oxide as a reduction promoter. In distinction, in applicant's process, use is first made of the exothermic chemical reduction with lithium ions followed by firing in either a reducing (hydrogen) or oxidizing (oxygen) atmosphere. Applicant's compounds are thus partially reduced throughout the plastic mass, the crystal growth being subsequently completed to a polarized state by the said firing schedule.

In general, the present plastic compositions are produced from the several components by the following method. The unfired $BaTiO_3$ or piezoelectric titanate mixture is thoroughly mixed or blended to a homogeneous mass or powder and sufficient polyethylene glycol is slowly added to form a stiff viscous slurry. Subsequently, the reducing component preferably in the form of a lithium salt is added, which causes an exothermic reaction generating a heat of reduction influential in controlling the crystal growth. The reducing component where LiCl is used is believed to partially reduce the titanate, for example to form barium trihydrochloride titanite. The level of temperature elevation achieved is primarily dependent upon the amount of lithium ion introduced, but may secondarily be influenced by the introduction of other additives, such as copper halides and oxides, zinc oxide and selenous acid. These latter additives are generally introduced in the original mix with the titanate compound.

After the heat of reaction has subsided, the moist crystalline plastic mass which exhibits unusual moisture retention characteristics, is ready as discussed above for firing in a hydrogen or oxygen atmosphere. The firing temperatures range around 2700° F. and the atmosphere is as mentioned designed to promote oxidation or reduction, depending on the component materials used. The ceramic mass can be fired in any required shape, thus yielding the final desired product.

The crystal ceramic mass performs many different functions depending on the component additives, titanates and reducing agents used, and the particular firing schedule and atmospheres. Among these functions are the generation of a voltage with the application of force or pressure, or by the application of heat, the voltage generated being a function of the applied stimulus, and the development of voltage and current storage devices, photosensitive elements, non-linear resistors, rectifiers, amplifiers, capacitors and modulators, dielectrics, ferroelectric ceramics, diodes, semi-conductors, N- and P-type, and thermocouples.

*Example No. 1*

| | Percent |
|---|---|
| Lead titanate—$PbTiO_3$ | 60 |
| Barium titanate—$BaTiO_3$ | 30 |
| Lithium chloride—LiCl | 10 |

All materials with the exception of LiCl are thoroughly mixed. The glycol is added. LiCl is added. Heat of reduction is in the area of 200° F. with the material being alternately brown, green, or blue. When this material is fired in an oxidizing atmosphere it possesses a fairly high K value albeit somewhat unstable. A plate one inch square, five millimeters thick showed a capacitance of one micro farad with a working voltage of 25 volts. The hysteresis is typical of the ferro-electric device. It shows active application as a storage element in large scale computer memories.

The firing temperature range is from 2500° F. to 3000° F.

*Example No. 2*

|  | Percent |
|---|---|
| Barium titanate—$BaTiO_3$ | 86 |
| Lead titanate—$PbTiO_3$ | 3 |
| Lithium hydroxide—$LiOH$ | 5 |
| Lithium chloride—$LiCl$ | 6 |

This material with the exception of LiCl was mixed with polyethylene glycol added to form a plastic slurry. LiCl was then added with a heat of reduction of 180° F. When fired in a hydrogen atmosphere, this material became an efficient non-linear resistor with voltage sensitive characteristics, a thermistor, and at the application of heat will change its resistance, or alternately, increase in current will change its resistance. It exhibits utility of being used as a solid state relay. It also exhibits utility as an N type material or alternately a P type material by changing the concentration of lead titanate to the extent that it could be used for transistor or diode application.

The firing temperature was about 3000° F.

*Example No. 3*

|  | Percent |
|---|---|
| Barium titanate—$BaTiO_3$ | 60 |
| Lead titanate—$PbTiO_3$ | 5 |
| Lithium hydroxide—$LiOH$ | 30 |
| Lithium chloride—$LiCl$ | 5 |

This mixture with the exception of LiCl was combined as a homogeneous mass with adequate polyethylene glycol added to make a plastic slurry. The heat of reduction at this point was approximately 140° F. The color was slightly on the tan side. The LiCl was then added and thoroughly mixed with an increasing heat of reduction to be noted of approximately 180° to 200° F. This mixture, when fired in a hydrogen atmosphere of 3000° F. for a period of two hours yields an N type semi-conductor mixture which has very fast response time with respect to heat. This mixture has as its end use thermocouple application and active use as a thermostat. Additional utility has been found by using this composition as a rectifier capable of operating at approximately 2000° F.

*Example No. 4*

|  | Percent |
|---|---|
| Barium titanate—$BaTiO_3$ | 80 |
| Calcium titanate—$CaTiO_3$ | 2 |
| Lithium titanate—$LiTiO_3$ | 3 |
| Lithium hydroxide—$LiOH$ | 5 |
| Lithium chloride—$LiCl$ | 10 |

All materials with the exception of LiCl were thoroughly mixed and polyethylene glycol 200 was added to make a stiff plastic paste. LiCl was then added and the heat of reduction was in the neighborhood of 180° F. and remained at that figure for approximately five minutes. This material when fired in oxidizing atmosphere showed dense crystal structure and will generate a voltage upon the application of pressure without resorting to polarization electrostatically during cooling by raising the material above its Curie point. It has found application in transducers, pressure sensitive devices, vibration sensitive devices, and as a storage media.

The firing temperature range was from 2500° F. to 3000° F.

*Example No. 5*

|  | Percent |
|---|---|
| Barium titanate—$BaTiO_3$ | 80 |
| Lead titanate—$PbTiO_3$ | 3 |
| Calcium titanate—$CaTiO_3$ | 3 |
| Zirconium titanate—$ZrTiO_3$ | 4 |
| Titanium oxide—$TiO_2$ | 3 |
| Lithium chloride—$LiCl$ | 7 |

All materials with the exception of LiCl were mixed and formed into a stiff plastic slurry with the addition of the polypropylene glycol. With glycol the heat of reduction was 200° F. The mixture was fired in an oxidizing atmosphere and created a moderately high value of dielectric constant. It was extremely stable temperature-wise. It showed a typical hysteresis of ferro-electric devices, was slightly pressure sensitive and exhibited diode action.

The firing temperature range was from 2500° F. to 3000° F.

*Example No. 6*

|  | Percent |
|---|---|
| Barium titanate—$BaTiO_3$ | 70 |
| Lithium hydroxide—$LiOH$ | 10 |
| Calcium titanate—$CaTiO_3$ | 2 |
| Zirconium titanate—$ZrTiO_3$ | 5 |
| Zinc chloride—$ZnCl_2$ | 3 |
| Selenous acid—$H_2SeO_3$ | 10 |

These elements, with the exception of the ZnCl and the $H_2SeO_4$, were thoroughly mixed to provide a homogeneous mass with polyethylene glycol being added after thoroughly mixing. The heat of reduction at this point was approximately 150° F. Then the ZnCl and $H_2SeO_4$ were added successively. The heat of reduction with the two elements, $ZnCl_2$ and $H_2SeO_3$ added rose above 200° F. This material generated a gas which was volatile and should not be exposed to open flame. Pieces of this material which have been fired in a reducing atmosphere of hydrogen at 2700° F. have demonstrated utility as solid state thermionic generators in that the application of heat with a temperature gradient of from 32° F. to 2200° F. will produce a voltage not in excess of 4/10 of a volt D.C. with a current of 150 micro amperes maximum dependent on the degree of heat applied. This material was polarity sensitive to heat in that a cylindrical rod of arbitrary dimensions—1 inch by ¼ inch, for example—will exhibit a positive or negative polarity dependent upon the end the head is applied. This composition was definitely a N type semi-conductor material which when joined with a given type material as a junction area shown highly efficient diode action and in one instance indicated highly efficient transistor action with a current gain of the sample piece being in the neighborhood of 100.

*Example No. 7*

|  | Percent |
|---|---|
| Barium titanate—$BaTiO_3$ | 75 |
| Lithium hydroxide—$LiOH$ | 15 |
| Lithium titanate—$LiTiO_3$ | 1 |
| Strontium titanate—$SrTiO_3$ | 4 |
| Lithium chloride—$LiCl$ | 3 |
| Selenous acid—$H_2SeO_3$ | 2 |

This mixture when compounded with the exception of the LiCl and selenous acid created a violent bubbling action which will settle down with the addition of the selenous acid and then the LiCl. There are three successive stages of heat reduction which are respectively at 135° F., 180° F. and 203° F. The end mixture has as its use when fired in an oxygen atmosphere a very high K dielectric material which exhibits capacities in the order of 10,000 mmf. per square centimeter by 5 mils. thick. Its temperature co-efficient is fairly reasonable being estimated in the area of 20 parts per million per 10° F. It is possessed with the typical ferro electric hysteresis and exhibits under certain frequencies a rectangular wave shape on the oscilloscope.

The firing temperature was 2700° F.

I claim:

1. The method of polarizing and promoting crystal growth of a perovskite type titanate ceramic comprising (a) reacting a mixture consisting essentially of at least 60% of an unfired piezoelectric metallic titanate selected from the group consisting of alkaline earth titanates, zirconium titanate, lead titanate, and combinations thereof, and from 1–40% of an exothermic inorganic chemical component containing lithium ions selected from the group consisting of lithium halides, LiOH, $Li_2S$ and $Li_2TiO_3$ homogeneously mixed with sufficient liquid polyalkylene glycol to form a thick plastic slurry, and (b) subsequently firing the partially reduced reaction product at a temperature in the range of about 2500° F. to 3000° F.

2. The method according to claim 1 wherein said firing is conducted in a reducing atmosphere.

3. The method of claim 1 wherein said firing is conducted in an oxidizing atmosphere.

4. The method according to claim 1 wherein said metallic titanate is predominantly $BaTiO_3$ and includes at least one additional titanate modifier selected from the group consisting of $Li_2TiO_3$, $PbTiO_3$ $CaTiO_3$, $SrTiO_3$ and $ZrTiO_3$.

5. The method according to claim 1 wherein the liquid polyalkylene glycol is polyethylene glycol.

6. The method according to claim 1 wherein the component containing lithium ions is present in amount of about 5–15% based on the dry weight of the reduced reaction product.

7. The method according to claim 1 wherein in addition to lithium ions the exothermic inorganic component contains zinc ions.

8. The method of promoting crystal growth and polarizing a piezoelectric ceramic titanate comprising (a) forming a thick plastic homogeneous slurry of sufficient liquid polyalkylene glycol and unfired metallic piezoelectric titanate selected from the group consisting of alkaline earth titanates, zirconium titanate, lead titanate, and combinations thereof, and adding to said slurry at least one ionic imbalance promoter selected from the group consisting of $H_2SeO_3$, ZnO, $TiO_2$, CuCl and CuO; (b) reacting in amount of from 1.01 to 67% of the amount of metallic titanate of an inorganic component selected from the group consisting of lithium halides, LiOH, $Li_2S$ and $Li_2TiO_3$ with said slurry, and (c) subsequently firing the reaction product at a temperature in the range of about 2500° to 3000° F.

9. The method as claimed in claim 8 wherein said imbalance promoter is added last to said slurry.

10. A polarized ceramic crystal consisting essentially of the reaction product of lithium free metallic titanates of the perovskite type structure and which contain substantial amounts of barium titanate and LiCl in the amount of about 10% by weight of the dry mixture, the reaction being conducted in the presence of sufficient liquid polyethylene glycol to form a thick plastic slurry, and said reaction product being subsequently fired in an oxygen atmosphere at 2700° F.

11. A polarized ceramic crystal consisting essentially of in approximately the following percentages by weight of the dry mix, the reaction product of

| | Percent |
|---|---|
| $BaTiO_3$ | 86 |
| $PbTiO_3$ | 3 |
| LiOH | 5 | homogeneously mixed with sufficient liquid polyalkylene glycol to form a thick plastic slurry, and

| | Percent |
|---|---|
| LiCl | 6 | said reaction product being fired in a hydrogen atmosphere at about 2700° F.

12. A polarized ceramic crystal consisting essentially of in approximately the following percentages by weight of the dry mix, the reaction product of

| | Percent |
|---|---|
| $BaTiO_3$ | 60 |
| $PbTiO_3$ | 5 |
| LiOH | 30 | homogeneously mixed with sufficient liquid polyalkylene glycol to form a thick plastic slurry, and

| | Percent |
|---|---|
| LiCl | 5 | said reaction product being fired in a hydrogen atmosphere at about 3000° F.

13. A polarized ceramic crystal consisting essentially of in approximately the following percentages by weight of the dry mix, the reaction product of

| | Percent |
|---|---|
| $BaTiO_3$ | 80 |
| $CaTiO_3$ | 2 |
| $LiTiO_3$ | 3 |
| LiOH | 5 | homogeneously mixed with sufficient liquid polyalkylene glycol to form a thick plastic slurry, and

| | Percent |
|---|---|
| LiCl | 10 | said reaction product being fired in an oxygen atmosphere at about 2700° F.

14. A polarized ceramic crystal consisting essentially of in approximately the following percentages by weight of the dry mix, the reaction product of

| | Percent |
|---|---|
| $BaTiO_3$ | 80 |
| $CaTiO_3$ | 3 |
| $ZrTiO_3$ | 4 |
| $PbTiO_3$ | 3 |
| $TiO_2$ | 3 | homogeneously mixed with sufficient liquid polyalkylene glycol to form a thick plastic slurry, and

| | Percent |
|---|---|
| LiCl | 7 | said reaction product being fired in an oxygen atmosphere at about 2700° F.

15. A polarized ceramic crystal consisting essentially of in approximately the following percentages by weight of the dry mix, the reaction product of

| | Percent |
|---|---|
| $BaTiO_3$ | 70 |
| $CaTiO_3$ | 2 |
| $ZrTiO_3$ | 5 |
| LiOH | 10 | with

| | Percent |
|---|---|
| $ZnCl_2$ | 3 | and

| | Percent |
|---|---|
| $H_2SeO_3$ | 10 | in the presence of sufficient liquid polyethylene glycol to form a thick plastic slurry, said $ZnCl_2$ and $H_2SeO_3$ being added in that order and the reaction product being fired in a hydrogen atmosphere at about 2700° F.

16. A polarized ceramic crystal consisting essentially of in approximately the following percentages by weight of the dry mix, the reaction product of

| | Percent |
|---|---|
| $BaTiO_3$ | 75 |
| $SrTiO_3$ | 4 |
| $LiTiO_3$ | 1 |
| LiOH | 15 | with

| | |
|---|---|
| $H_2SeO_3$ | 2 | and

| | |
|---|---|
| LiCl | 3 | in the presence of sufficient liquid polyethylene glycol to form a thick plastic slurry, said $H_2SeO_3$ and LiCl being added in that order, the reaction product being fired in an oxygen atmosphere at about 2700° F.

References Cited in the file of this patent

UNITED STATES PATENTS

| 2,520,376 | Roupe et al. | Aug. 29, 1950 |
| 2,598,707 | Matthias | June 3, 1952 |
| 2,602,753 | Woodcock et al. | July 8, 1952 |
| 2,750,657 | Herbert et al. | June 19, 1956 |
| 2,803,519 | Karan | Aug. 20, 1957 |

OTHER REFERENCES

"Synthetic Organic Chemicals," Carbide and Carbon Chem. Corp., N.Y., 12th ed., 1945, pp. 19–23.

Fang et al.: "Domain Conversion of Multidomain Barium-Titanate Single Crystal," Physical Review, vol. 108, No. 2, October 1957, pp. 242–243.